(12) United States Patent
Srinivasan et al.

(10) Patent No.: US 8,935,757 B2
(45) Date of Patent: Jan. 13, 2015

(54) OAUTH FRAMEWORK (71) Applicant: Oracle International Corporation, Redwood Shores, CA (US)

(72) Inventors: Venkataraman Uppili Srinivasan, Fremont, CA (US); Rajeev Angal, San Jose, CA (US); Ajay Sondhi, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/631,538

(22) Filed: Sep. 28, 2012

(65) Prior Publication Data
US 2013/0086645 A1 Apr. 4, 2013

Related U.S. Application Data (60) Provisional application No. 61/541,026, filed on Sep. 29, 2011.

(51) Int. Cl.
*G06F 15/16* (2006.01)
*H04L 29/06* (2006.01)

(52) U.S. Cl.
CPC ..................................... *H04L 63/10* (2013.01)
USPC ....................... 726/4; 726/9; 726/6

(58) Field of Classification Search
CPC ......... G06F 21/00; G06F 21/31; G06F 21/33; G06F 21/335; G06F 21/44; G06F 21/6236; H04L 67/02; H04L 63/062; H04L 63/0807; H04L 63/10
See application file for complete search history.

(56) References Cited

U.S. PATENT DOCUMENTS

| | | | |
|---|---|---|---|
| 7,685,206 | B1 | 3/2010 | Mathew et al. |
| 7,784,092 | B2 | 8/2010 | Pearson et al. |
| 7,788,494 | B2 | 8/2010 | Aissi et al. |
| 7,836,484 | B2 | 11/2010 | Pardo-Biazquez et al. |
| 2009/0296936 | A1 | 12/2009 | Lie et al. |
| 2009/0300355 | A1 | 12/2009 | Crane et al. |
| 2010/0011421 | A1 | 1/2010 | Chari et al. |

(Continued)

OTHER PUBLICATIONS

Non-Final Office Action for U.S. Appl. No. 13/464,880 (Mar. 28, 2014) 19 pages.

(Continued)

*Primary Examiner* — Nirav B Patel
*Assistant Examiner* — Mohammed Waliullah
(74) *Attorney, Agent, or Firm* — Kilpatrick Townsend and Stockton LLP (57) ABSTRACT

A framework, which conforms to the OAuth standard, involves a generic OAuth authorization server that can be used by multiple resource servers in order to ensure that access to resources stored on those resource servers is limited to access to which the resource owner consents. Each resource server registers, with the OAuth authorization server, metadata for that resource server, indicating scopes that are recognized by the resource server. The OAuth authorization server refers to this metadata when requesting consent from a resource owner on behalf of a client application, so that the consent will be of an appropriate scope. The OAuth authorization server refers to this metadata when constructing an access token to provide to the client application for use in accessing the resources on the resource server. The OAuth authorization server uses this metadata to map issued access tokens to the scopes to which those access tokens grant access.

15 Claims, 7 Drawing Sheets

(56) References Cited

U.S. PATENT DOCUMENTS

| | | |
|---|---|---|
| 2010/0043065 A1 | 2/2010 | Bray et al. |
| 2010/0100952 A1 | 4/2010 | Sample et al. |
| 2010/0212004 A1 | 8/2010 | Fu et al. |
| 2011/0296504 A1 | 12/2011 | Burch et al. |
| 2011/0314532 A1 | 12/2011 | Austin et al. |
| 2011/0314533 A1 | 12/2011 | Austin et al. |
| 2012/0005733 A1 | 1/2012 | Ross |
| 2012/0066757 A1 | 3/2012 | Vysogorets et al. |
| 2012/0117626 A1* | 5/2012 | Yates et al. ............ 726/4 |
| 2012/0144034 A1 | 6/2012 | McCarty |
| 2012/0151564 A1 | 6/2012 | Robert et al. |
| 2012/0227098 A1 | 9/2012 | Obasanjo et al. |
| 2012/0278876 A1 | 11/2012 | Mcdonald |
| 2012/0311663 A1 | 12/2012 | Seidl et al. |
| 2013/0007846 A1* | 1/2013 | Murakami et al. ............ 726/4 |
| 2013/0024919 A1 | 1/2013 | Wetter et al. |
| 2013/0103802 A1 | 4/2013 | Kawato |
| 2013/0227663 A1 | 8/2013 | Cadenas-Gonzalez |

OTHER PUBLICATIONS

PCT Patent Application No. PCT/US2012/57754, International Search Report mailed on May 14, 2014, 9 pages.

Lodderstedt et al. "OAuth 2.0 Security Considerations," Internet-Draft, Internet Engineering Task Force (Apr. 2011).

Final Office Action for U.S. Appl. No. 13/464,880 (Aug. 29, 2014) 19 pages.

* cited by examiner

OAUTH FRAMEWORK

CLAIM OF PRIORITY

The present application claims priority under 35 U.S.C. §119 to U.S. Provisional Patent Application Ser. No. 61/541,026, filed Sep. 29, 2011, and titled "RELYING PARTY AND OAUTH FRAMEWORK."

BACKGROUND

An identity management system is an information system, or a set of technologies that can be used for enterprise or cross-network identity management. Identity management describes the management of individual identities, their authentication, authorization, roles, and privileges within or across system and enterprise boundaries with the goal of increasing security and productivity while decreasing cost, downtime, and repetitive tasks. One aspect of identity management is "single sign-on" (SSO). One standard that is particularly useful in the field of identity management is OAuth.

SSO is a property of access control of multiple related but independent software systems. With this property, a user logs in once and gains access to all systems without being prompted to log in again at each of them. Conversely, single sign-off is the property whereby a single action of signing out terminates access to multiple software systems. As different applications and resources support different authentication mechanisms, single sign-on internally translates to and stores different credentials compared to what is used for initial authentication. SSO reduces phishing success, because users are not trained to enter passwords everywhere without thinking SSO reduces password fatigue from different user name and password combinations. SSO reduces time spent re-entering passwords for the same identity. SSO reducing information technology (IT) costs due to a lower number of IT help desk calls about passwords. SSO provides security on all levels of entry/exit/access to systems without the inconvenience of re-prompting users. SSO also allows for centralized reporting for compliance adherence. SSO uses centralized authentication servers that all other applications and systems utilize for authentication purposes, and combines this with techniques to ensure that users do not have to actively enter their credentials more than once.

OAuth is an open standard for authorization. An indirect effect of authorization is authentication. OAuth allows users to share their private resources (e.g., photos, videos, contact lists, etc.) stored on one site with another site without having to hand out their credentials, typically supplying username and password tokens instead. Each token grants access to a specific site for specific resources and for a defined duration. This allows a user to grant a third party site access to their information stored with another service provider, without sharing their access permissions or the full extent of their data. For example, a token might grant access to a video editing site for videos from a specific album for the next two hours.

For example, in a typical scenario, a user of LinkedIn might be asked for permission to import, into LinkedIn, that user's contacts from Yahoo. LinkedIn might want to obtain these contacts in order to send e-mail messages inviting each of the user's contacts to join LinkedIn, for example. Prior to OAuth, this request for permission might have involved a request that the user provide, to LinkedIn, the user's Yahoo user identity and password. This information was requested so that LinkedIn could log-in to the user's Yahoo account as that user, and then obtain that user's contacts from that user's Yahoo account. Generally speaking, permitting LinkedIn (or any site) with the user's Yahoo (or any other site) identity and password is a bad idea because it grants the former site unlimited access to the user's account on the latter site. Such unlimited access is nearly always much more access than the former site actually requires to accomplish its goal, such as merely obtaining a contact list.

A better idea is to provide the former site with a limited authorization relative to the user's account on the latter site. The limited authorization may specify a specific set of operations that the former site can perform relative to the user's account on the latter site. For example, referring to the typical scenario above, the limited authorization might specify that LinkedIn can only access the user's contact list, but perform no other operations relative to the user's account, on Yahoo. OAuth allows for such limited authorization. OAuth provides delegation of authorization.

The technique by which OAuth delegates authorization may be understood relative to an analogy. Often, when a car owner temporarily relinquishes control of his car to a valet so that the valet can park the car for the owner, the owner does not provide a general-use master key to the valet, but instead provides a more limited-use valet key to the valet. The valet key permits the valet with sufficient access to drive the car, but does not provide the valet with access to everything that the owner possesses within the car. In the same manner, the use of OAuth may grant a first site access to a user's contact list stored by a second site, without also permitting the first site to perform other operations relative to the user's account on the second site—such as reading e-mail messages that might be stored on the second site, for example. OAuth allows the first site to be given a limited authorization to perform a specified set of operations, and no others, relative to the second site.

For another example, a user might want to use a photo printing service provided by a first site, such as Snapfish, to print certain color photos that are electronically stored on a second site, such as Flickr, which is independent of the first site. More specifically, the user might want to print only the photos that are stored in a particular album on Flickr, such as an album containing photos from the user's recent visit to Alaska. Although the user might have a multitude of different albums stored on his Flickr account, the user might want to print only the photos from the Alaska album. Under such circumstances, the user probably prefers that Snapfish does not access the contents of any of his Flickr albums other than those contained within the Alaska album. In the foregoing scenario, using OAuth terminology, Snapfish is considered to be a client, and Flickr is considered to be a resource server (the photo data being the resources) as well as an OAuth authorization server. As the owner of the resources (e.g., photo data) stored by the resource server, the user is also a resource owner.

Given the example presented above, the user might first use his Internet browser application to instruct the client (e.g., Snapfish) to print the photos in the user's Alaska album on the resource server (e.g., Flickr). In response, the client (e.g., Snapfish) redirects the user to the site of the resource authorization server (e.g., Flickr). This redirection operation may indicate, to the resource server, the limited set of data (e.g., contents of the Alaska album) to which the client desires access. At that moment, the resource authorization server does not know who the user is, as the user has not let authenticated himself to the resource authorization server. Therefore, the resource authorization server requires the user to authenticate. As is mentioned above, an indirect effect of authorization is authentication. After the user authenticates himself to the resource authorization server (e.g., by providing his username and password that are relevant to the resource authorization server), the resource authorization server sends a consent page to the user's Internet browser. The consent page asks the user to verify that the resource authorization server (e.g., Flickr) has the user's permission to provide a limited, specified set of data (e.g., contents of the Alaska album) to the client (e.g., Snapfish). Assuming that the user consents, the resource authorization server then responsively sends an authorization code to the client. This authorization code may be sent through the "front channel;" or, in other words, via the user's Internet browser using a redirect.

In this scenario, the client (e.g., Snapfish) is a trusted partner of the authorization server (e.g., Flickr). The client receives the authorization code, or "grant," and stores the authorization code. The client maintains this authorization code indefinitely, until the user actively revokes that authorization code. The user may log-in to the OAuth authorization server in order to see a list of grants that the OAuth authorization server has provided on the user's behalf to various clients. In response to receiving the authorization code, the client (e.g., Snapfish) makes a "back channel" call to the authorization server (e.g., Flickr). A back channel call is a communication that does not involve the user's Internet browser. The back channel call requests an access token from the authorization server. The access token specifies the scope of the access that the client is permitted to the user's account on the authorization server. For example, the access token might indicate that the client is permitted access only to contents of the user's Alaska album. The authorization server sends the requested access token back to the client via the back channel. The client stores the access token. Thereafter, until the access token expires, or until the user revokes the grant (i.e., the authorization code), the client can present the access token to the resource server in order to access, on the resource server, the resources specified by the access token. If the user has already revoked the grant related to the access token, then the access token becomes ineffective even if the access token has not let expired.

In addition to an access token, the authorization server may provide a "refresh token" to the client. While the access token often has a specified longevity after which it expires, a refresh token is a long-lived token. The client may store the refresh token along with the related access token. Thereafter, if the resource server objects that the client's current access token has expired, then the client may present the refresh token to the resource server in order to obtain a new access token from the resource server.

Beneficially, the approach employed by OAuth avoids the disclosure, to the client, of the user's password for the user's account on the resource server. The avoidance of this disclosure of credentials prevents the client from performing unauthorized actions relative to the user's account on the resource server. The only time that the user supplies his password is during the user's initial authentication directly with the resource server, after being redirected from the client's site.

BRIEF SUMMARY

Embodiments of the present invention relate to identity management, authentication, and authorization frameworks. In one embodiment, a framework is provided for integrating Internet identities in enterprise identity and access management (IAM) infrastructures. According to another embodiment, a framework is provided for open authorization. There are so many different use cases for an OAuth system that a single approach does not always fit each use case. Therefore, embodiments of the invention make an OAuth system more flexible. Embodiments of the invention make an OAuth system easier for enterprise administrators of that system to customize for their own uses. Embodiments of the invention make an OAuth system more customizable by application and resource providers.

Traditionally, a resource server and an OAuth authorization server have been the same entity. According to an embodiment of the invention, a generic framework is provided that frees a resource server from the responsibilities of an OAuth authorization server. These responsibilities can include scope management, issuance of authorization tokens, issuance of refresh tokens, and issuance of access tokens. Thus, a generic OAuth authorization server can be implemented according to this generic framework. Consequently, each individual resource server does not need to implement its own proprietary OAuth authorization server. Indeed, according to an embodiment of the invention, multiple different resource servers can all concurrently make use of the functions of the same generic OAuth authorization server. For example, in an embodiment of the invention, a single OAuth authorization server can manage scopes for several different resource servers all at the same time. There can be a many-to-one relationship between resources servers and an OAuth authorization server.

In one embodiment of the invention, in order to achieve this ability to interact with multiple different resource servers, the generic OAuth authorization server maintains mapping data that indicates which tokens belong to which resource servers, who the trusted partners of each resource server are, etc. Furthermore, in an embodiment of the invention, the generic OAuth framework is constructed in such a manner that a resource server administrator can easily customize the framework to accommodate the particular use case for his resource server. Different resource server administrators can "plug-in" their specific components into the generic OAuth framework. Thus, in one embodiment of the invention, each resource server informs the generic OAuth authorization server regarding the potential scopes (i.e., limited operations relative to resources) that the resource server might use.

The foregoing, together with other features and embodiments will become more apparent upon referring to the following specification, claims, and accompanying drawings.

DETAILED DESCRIPTION

In the following description, for the purposes of explanation, specific details are set forth in order to provide a thorough understanding of embodiments of the invention. However, it will be apparent that the invention may be practiced without these specific details. The entire contents of U.S. Provisional Patent Application Ser. No. 61/541,026, filed Sep. 29, 2011, and titled "RELYING PARTY AND OAUTH FRAMEWORK," are incorporated by reference herein.

Figure 1:
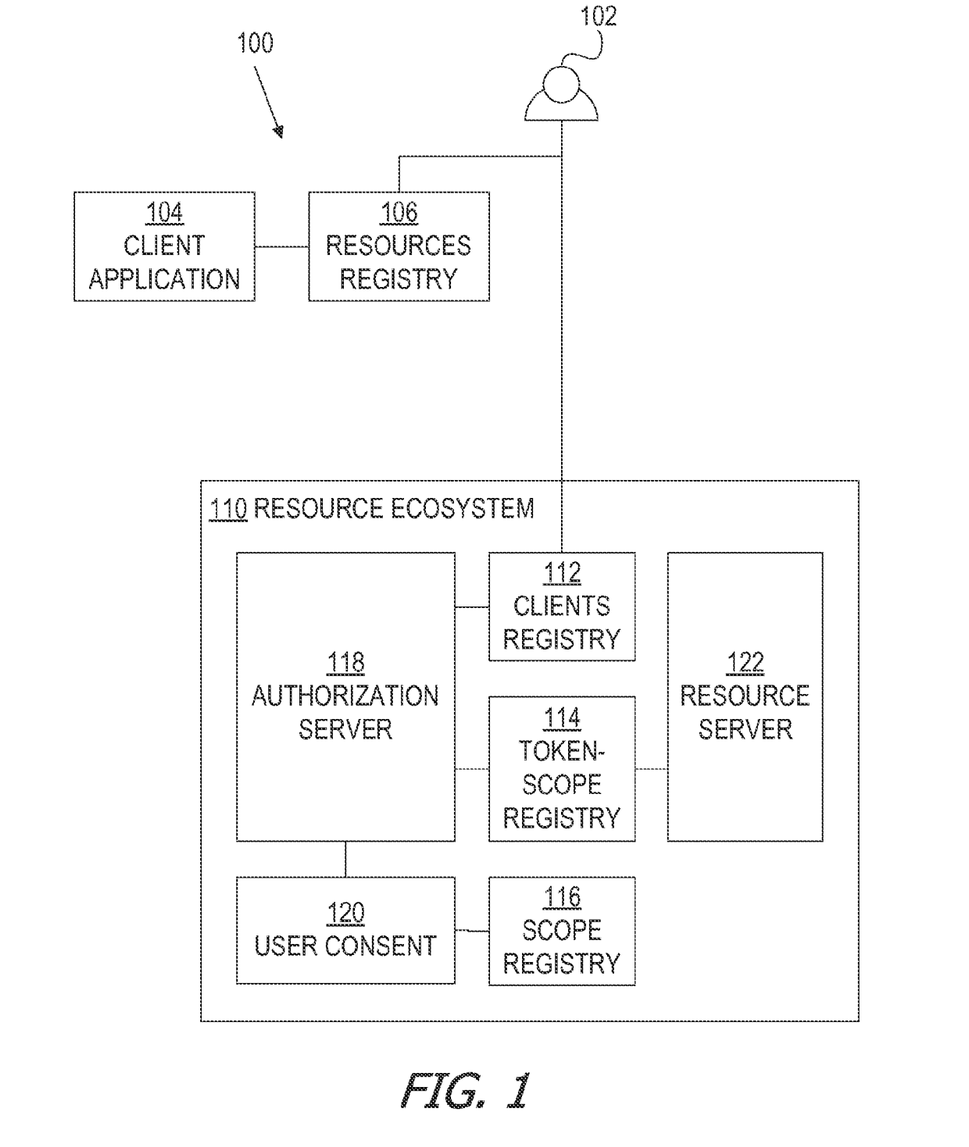
FIG. 1 is a block diagram illustrating an OAuth system architecture and logical components thereof, according to an embodiment of the invention.

FIG. 1 is a block diagram illustrating an OAuth system architecture 100 and logical components thereof, according to an embodiment of the invention. Architecture 100 includes a resource owner (or user) 102, a client application 104, a resources registry 106, and a resource ecosystem 110. Resource ecosystem includes a clients registry 112, a token-scope registry 114, a scope registry 116, a user consent 120, and a resource server 122. Although one resource server 122 is shown, embodiments of the invention can include multiple separate resource servers. As seen from the connections in FIG. 1, client application 104 interacts with resources registry 106. Resource owner 102 interacts with resources registry 106 and with clients registry 112. Authorization server 118 interacts with clients registry 112, token-scope registry 114, and user consent 120. Resource server 122 interacts with token-scope registry 114. User consent 120 interacts with scope registry 116. Various of these components and their functions are discussed further below.

Embodiments of the invention can involve the delegation of authorization. Different resource use cases sometimes require different scope definitions. Different resources sometimes can rely on different authorization models and solutions. Different specific user actions can be required to give a client application consent to access resources maintained by different resource servers. Preferably, each different resource provider should not need to offer a separate proprietary OAuth authorization server to integrate with the specifics of that resource provider. The unfortunate result of each resource provider offering a separate proprietary OAuth authorization server would be that an enterprise wishing to integrate with multiple different resource providers and multiple different client form factors will have to deal with a myriad of different OAuth authorization server interfaces.

Therefore, in an embodiment of the invention, an generic OAuth framework architecture is provided. The framework can include OAuth wire protocol components (client and server), including metadata and runtime registries. The framework can include an infrastructure of pluggable "contracts" to customize and deploy application-specific solutions.

In one embodiment of the invention, resource server 122 stores, in token-scope registry 114, indications of the scopes that resource server 122 recognizes. Each such scope can be indicative of a different set of operations that can be performed relative to a different set of resources stored on resource server 122. Inasmuch as certain embodiments may include multiple different or separate resource servers, token-scope registry 114 can store mapping between different resource servers and different scopes. Furthermore, in one embodiment of the invention, each scope is mapped to a separate token within token-scope registry 114. Thus, by reference to token-scope registry 114, resource server 122 can determine the set of operations and the set of resources that are mapped to a particular token presented to resource server 122 by client application 104. Resource server 122 can limit the operations performed by client application 104 relative to resources maintained by resource server 122 to those operations specifically indicated by the set of operations mapped to the particular token.

Thus, in one embodiment of the invention, each particular resource server in a group of multiple resource servers provides, to the OAuth framework, a different set of metadata that indicates the scopes that can be mapped to tokens that can be used to access resources on that particular resource server. The scopes are therefore customizable by the administrators of the resource servers, making the OAuth framework flexible and applicable to many different use cases. Consequently, many different types of resource servers can all make use of the same generic OAuth framework without requiring the creation of a specific OAuth framework for each different type of resource server.

In an embodiment, the generic OAuth framework shown in FIG. 1 provides a basic conceptual structure. The OAuth framework can layer on top of existing identity management products. In the OAuth framework, contracts can define integration points with these existing products. The combination of the OAuth framework and contract implementations can fulfill miscellaneous use cases and deployment options. According to an embodiment, the OAuth framework includes two broad "roles": a consumer/client role, and an authorization server/resource server role. The authorization server/resource server role is discussed below with reference to FIG. 2, while the consumer/client role is discussed below with reference to FIG. 3.

Figure 2:
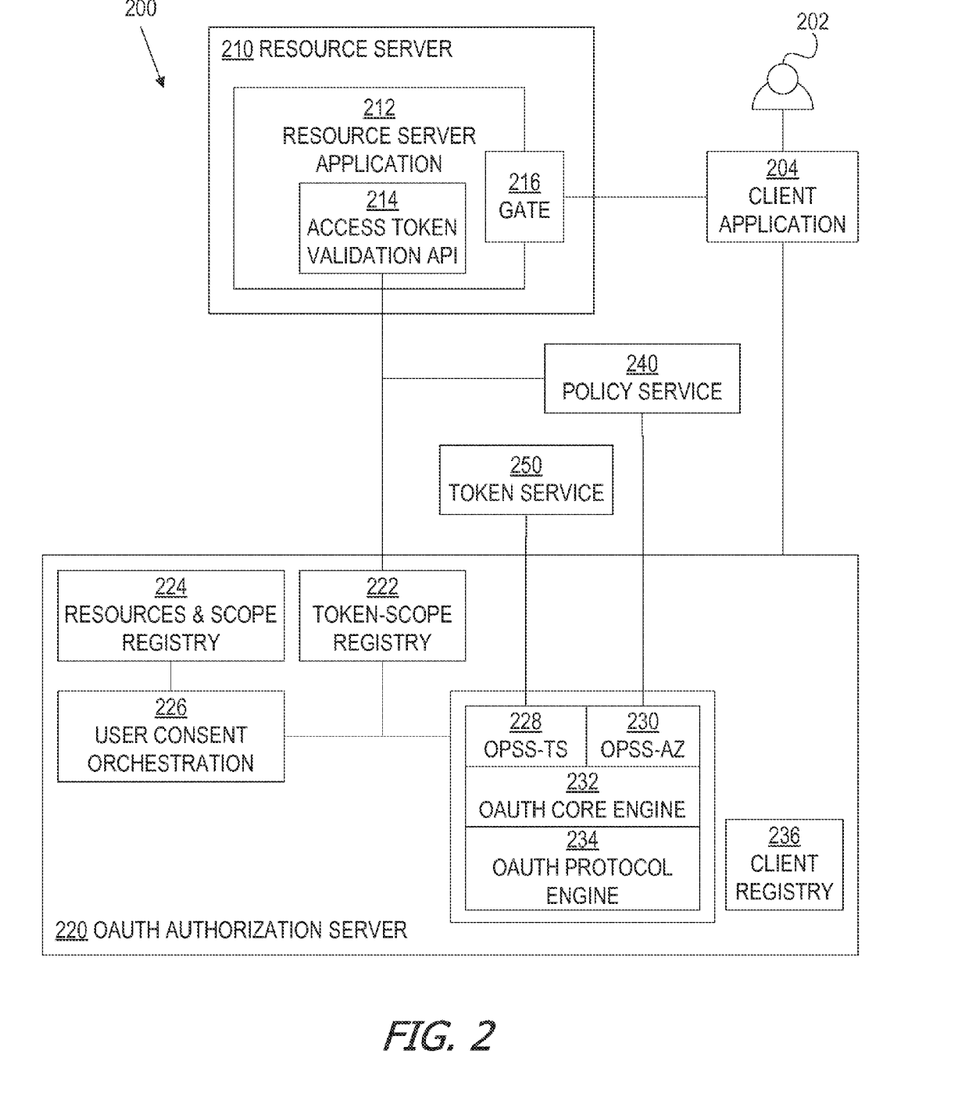
FIG. 2 is a block diagram illustrating a resource server environment, according to an embodiment of the invention.

FIG. 2 is a block diagram illustrating a resource server environment 200, according to an embodiment of the invention. In an embodiment of the invention, environment 200 includes resource owner (or user) 202, client application 204, resource server 210, OAuth authorization server 220, policy service 240, and token service 250. Resource server 210 includes resource server application 212, which includes access token validation API 214 and gate 216. OAuth authorization server 220 includes token-scope registry 222, resources & scope registry 224, user consent orchestration 226, OPSS-TS (Oracle Platform Security Services-TS) 228, OPSS-AZ (Oracle Platform Security Services-AZ) 230, OAuth core engine 232, OAuth protocol engine 234, and client registry 236. In an embodiment, resource owner 202 interacts with client application 204 through gate 216, which accesses access token validation API 214. Client application 204 also interacts with OAuth authorization server 220. Access token validation API 214 interacts with token-scope registry 222 and with policy service 240. OPSS-TS interacts with token service 250. OPSS-AZ interacts with policy service 250. Components 228-234 collectively interact with token-scope registry 222 and with user consent orchestration 226. User consent orchestration 226 interacts with resources & scope registry 224.

In an embodiment of the invention, resources & scope registry 224 stores resource information, scopes, and miscellaneous metadata related to resources and services exposed via OAuth authorization server 220. In an embodiment of the invention, client registry 236 stores trust keys and secrets for authorized remote clients (e.g., client application 204). In an embodiment, token-scope registry 222 stores access tokens and refresh tokens that are issued to clients (e.g., client application 204) based on user (e.g., resource owner 202) consent. In an embodiment, token-scope registry 222 stores AuthZ scope information that is associated with issued access tokens.

In an embodiment of the invention, resource server 210 registers its own metadata with OAuth authorization server 220. Different resource servers can register different metadata with the same OAuth authorization server. As part of the registration process, this metadata is imported into OAuth authorization server 220. The metadata indicates the various different scopes recognized by, or exposed by, resource server 210. Each scope specifies a different subset of the resources maintained by resource server 210. In an embodiment of the invention, at the time of registration, each scope recognized by resource server 210 is mapped to resource server 210 (only) in resources & scope registry 224. Thus, in an embodiment of the invention, resources & scope registry indicates, for each registered scope, the set of the corresponding resource server's resources that are accessible within that scope. A scope might indicate, for example, that only a particular photo is accessible, or that a particular folder of photos is accessible, or that a particular set of folders is accessible. A scope can indicate operations that are permissible relative to specified resources, such as read, update, delete, create, etc.

In an embodiment of the invention, OAuth authorization server 220 issues access tokens to client application 204. In an embodiment, for each such access token, OAuth authorization server 220 stores, in token-scope registry 222, a mapping between that access token and the particular scope (selected from among the scopes stored in resources & scope registry 224) that is assigned to that access token. Different access tokens for the same resource server may have different scopes assigned to them. Thus, when client application 204 presents an access token to OAuth authorization server 220, OAuth authorization server 220 may refer to token-scope registry 222 to determine the scope that is mapped to that access token, and then may refer to resources & scope registry 224 to determine the resources that are accessible within that scope.

In an embodiment of the invention, user consent from resource owner 202 is required in order for OAuth authorization server 220 to grant an access token to client application 204. For example, if client application 204 requests access to a particular resource (or a particular scope including that resource) from resource server 210, then resource server 210 may redirect the request to OAuth authorization server 220. OAuth authorization server 220 may invoke user consent orchestration 226 in order to ask resource owner 202 to verify that client application 204 should be granted access to the particular resource (or particular scope). In an embodiment, user consent orchestration 226 indicates, to resource owner 202, the scope to which client application 204 is seeking access, and provides resource owner 202 with the opportunity to consent to or decline access of that scope. More specifically, OAuth authorization server 220 may ask resource owner 220 to verify that client application 204 should be granted access specified by the particular scope (as indicated in resources & scopes registry 224), including the particular resource. In response to receiving consent from resource owner 202, OAuth authorization server 220 may generate an access token and store, in token-scope registry 222, a mapping between that access token and the particular scope. OAuth authorization server 220 can provide the access token to client application 204.

Client application 204 can then attempt to access the particular resource on resource server 210 by presenting the access token to resource server application 212. An agent on resource application server 212 can intercept the token and validate the token with OAuth authorization server 220 (e.g., via access token validation API 214) before allowing client application 204 to access the particular resource. If the particular resource that client application 204 attempts to access does not fall within the scope that is mapped the access token in token-scope registry 222 (e.g., if client application 204 attempts to access a folder that is outside of the scope of access to which resource owner 202 previously consented), then OAuth authorization server 220 will not validate the token, and resource server 210 will refuse to grant client application 204 access to the particular resource. Thus, scope of access is based on specific consent to that scope by resource owner 202. Resource owner 202 has the opportunity to refuse to give consent to a specific scope requested by client application 204, in which case OAuth authorization server 220 will not create an access token for client application 204. In one embodiment of the invention, each client application's request to access a resource maintained by resource server 210 also specifies a scope that is mapped to resource server 210 in resources & scope registry 224, and it is this specified scope for which the consent of resource owner 202 is requested as discussed above.

According to an embodiment of the invention, consistent with the discussion above, enforcement of access restrictions occurs at the time that client application 204 presents an access token to resource server 210. Enforcement requires an understanding of the scope that is encoded by the access token. Access tokens are issued by OAuth authorization server 220 per the scope definitions. Access tokens are validated per the scope that is encoded by the issued tokens. In one embodiment of the invention, policy service 240 and token service 250 in combination maintain the state of the access tokens that were issued and authorize issued access tokens. In an embodiment of the invention, a customer (i.e., owner and/or operator of resource server 210) can provide its own policy service 240 and token service 250. The OAuth framework may provide programmatic contracts, or programmatic interfaces, by which such customers can plug their own policy and token services into the OAuth framework in a manner that matches the scopes that those customers define. Each customer may publish its own set of scopes. The published set of scopes may indicate the form of the data that the customer's token service will return. The OAuth framework additionally may provide, to such customers, programming contracts or programmatic interfaces that permit policies to be created at the time of token issuance. These programmatic contracts or programmatic interfaces allow customers to plug their own custom programmatic code into the OAuth framework. Using these programmatic interfaces, a customer can wire its existing infrastructure into the OAuth system. In an embodiment, a customer that publishes its set of scopes is responsible for ensuring that its token and/or policy services return tokens that include scope information that is consistent with the published scopes. In response to client application 204 attempting to use a token, OAuth authorization server 220 can invoke an application programming interface (API) that will look up the customer's policy and validate that token.

In an embodiment, the OAuth framework specifies the interfaces that the customer's code (e.g., the code for token service 250 and policy service 240) needs to implement in order to interface with OAuth authorization server 220. The interfaces may be published so that customers are aware of the parameters that each interface expects to receive and the values that each interface expects to return. When client application 204 makes a request of OAuth authorization server 220, OAuth authorization server 220 makes responsive calls to the APIs related to that request. These calls may involve calls to customer-coded components that generate access tokens and provide those access tokens to client application 204, for example. In one embodiment of the invention, OAuth authorization service 220 exposes the aforementioned programmatic contracts or programmatic interfaces in the form of OPSS-TS 228 and OPSS-AZ 230. The customer's own implementation of token service 250 can interface with OPSS-TS 228, while the customer's own implementation of policy service 240 can interface with OPSS-AZ 230. OAuth authorization server 220 may invoke separate APIs for access token creation and access token validation. The customer may implement custom programmatic code to perform each task. During validation, policies constructed during token creation can be accessed to determine whether the action that client application 204 seeks to perform relative to resources matches the policy that is encoded by the access token that client application 204 presents.

Additionally, in one embodiment of the invention, the customer's own implementation of user consent orchestration 226, which is invoked when client application 204 seeks an access token from OAuth authorization server 220, can be plugged into OAuth authorization server 220. Interfaces to resources & scope registry 224 and token-scope registry 222 may be provided to the customer so that the customer can design its implementation of user consent orchestration 226 to obtain data from components 222 and 224 for use in constructing the consent request.

In an embodiment of the invention, the mappings stored in resources & scope registry 224 indicate not only the subsets of resources that are included within each scope, but also the exclusive subsets of operations that are permitted to be performed by client application relative to those subsets of resources. For example, a particular mapping may indicate for a particular scope that read and update operations, but not create or delete operations, can be performed relative to a specified subset of resources (e.g., files, folders, directories, lists, profiles, images, documents, etc.) maintained on resource server 210. Thus, in one embodiment of the invention, the consent request discussed above specifies not only a subset of resources that are associated with a scope, but also a subset of operations that are associated with that scope. Consequently, resource owner 202 knows precisely the kinds of operations that he is giving consent for client application 204 to perform relative to the subset of resources within the consent-request-specified scope.

According to an embodiment of the invention, client application 204 requests resource access equivalent to one of the specific scopes that resource server 210 has registered with OAuth authorization server 220. Thus, in one embodiment of the invention, client application 204 is designed with an awareness of the specific scopes that will be registered for resource server 210. Because client application 204 may interact with resources maintained by a variety of different resource servers, the vendors of various resource servers may agree upon a standard set of scopes that their resource servers will register with OAuth authorization server 220, thereby easing the design task of the designers of client application 204 and other client applications.

Figure 3:
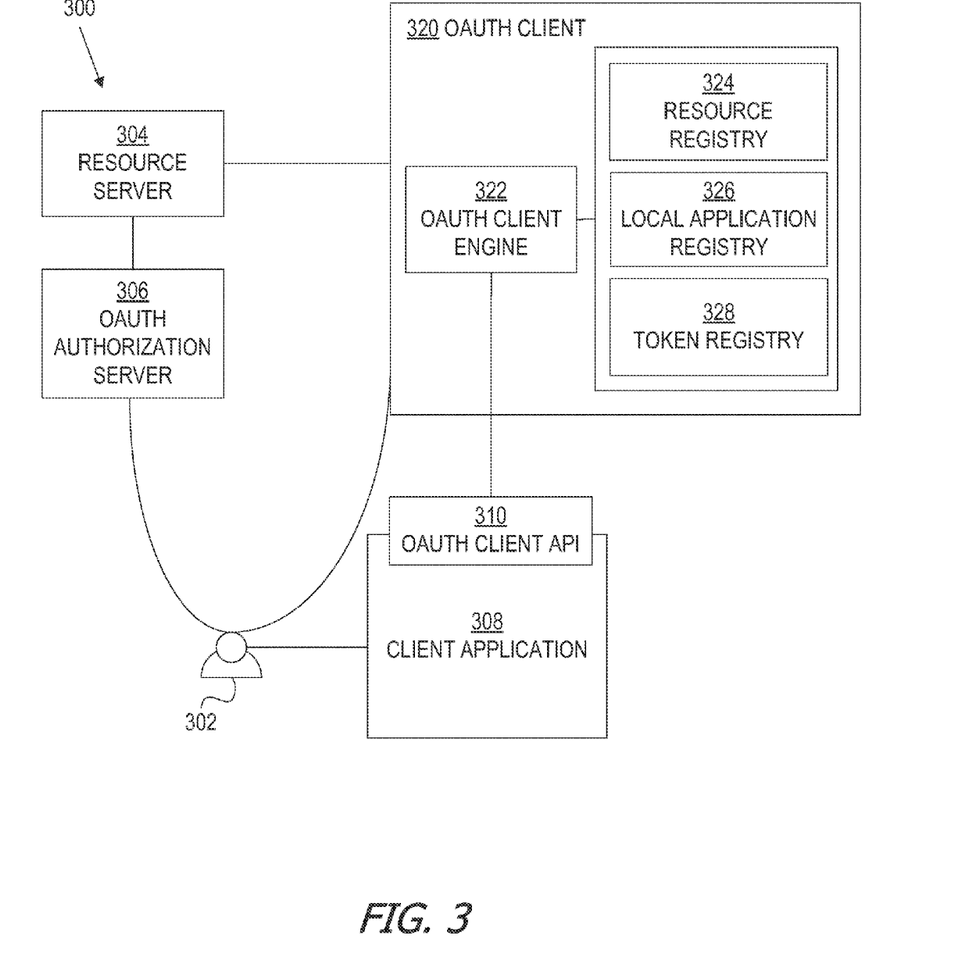
FIG. 3 is a block diagram illustrating an OAuth client environment, according to an embodiment of the invention.

In one embodiment of the invention, a client framework is provided in order to allow client applications, such as client application 204, to implement "hooks" for various different types of resource providers. For example, client application 204 might implement separate hooks for Google, Facebook, Yahoo, LinkedIn, etc. FIG. 3 is a block diagram illustrating an OAuth client environment 300, according to an embodiment of the invention. OAuth client environment 300 includes a resource owner 302, a resource server 304, an OAuth authorization server 306, a client application 308, and an OAuth client 320. Client application 308 includes an OAuth client API 310. OAuth client 320 includes an OAuth client engine 322, a resource registry 324, a local application registry 326, and a token registry 328. Resource server 304 and OAuth authorization server 306 interact with each other. Resource server 304 and OAuth client 320 interact with each other. OAuth authorization server 306 and OAuth client 320 interact with each other via resource owner 302 (e.g., through redirection accomplished by an Internet browser of resource owner 302). Resource owner 302 also interacts with client application 308. Client application 308 interacts with OAuth client engine 322 through OAuth client API 310. OAuth client engine 322 interacts with resource registry 324, local application registry 326, and token registry 328.

According to an embodiment of the invention, metadata regarding all of the different types of resource servers with which client application 308 may interact are stored within resource registry 324, enabling client application 308 to interact with a variety of different resource servers. Resource registry can indicate, for example, the different sets of scopes recognized by each different type of resource server. Consequently, client application 308 is able to request access corresponding to a particular scope recognized by resource server 304, and this particular scope may be specified in the consent request that OAuth authorization server 306 sends to resource owner 302 on behalf of client application 308. Resource providers can publish their OAuth standard-compliant scope specifications so that designers can populate resource registry 308 with the appropriate server-to-scope mappings for those providers' resource servers. In an embodiment, because resource registry 308 can be populated independently of client application 308, client application 308 does not need to be revised in order to interact with newly discovered resource servers; instead, developers can simply "plug-in" the new mappings for those resource servers into resource registry 324, with which client application 308 interacts.

Often, a complex website that acts as a resource provider or server is not a monolithic application. Often, instead, a complex website constitutes a variety of different applications. In an embodiment of the invention, local application registry 326 stores mappings between various different resource providers and the sets of applications that are offered or exposed by those resource providers. Each such application may be mapped in local application registry 326 to a separate Uniform Resource Locator (URL) for that application. In one embodiment of the invention, local application registry 326 stores trust keys to exercise the OAuth client role to access remote resources.

Typically, client application 308 is able to use a particular access token multiple times to access resources maintained by resource server 304 before that particular access token expires.

In an embodiment of the invention, the access tokens that client application 308 obtains from OAuth authorization server 306 are stored within token registry 328. Inasmuch as client application 308 may interact with multiple different resource servers, token registry 328 can maintain mappings between access tokens and the different resource servers to which those access tokens pertain. Token registry 328 can store both access tokens and refresh tokens for various different remote resource servers (e.g., resource server 304) and scopes.

Figure 4:
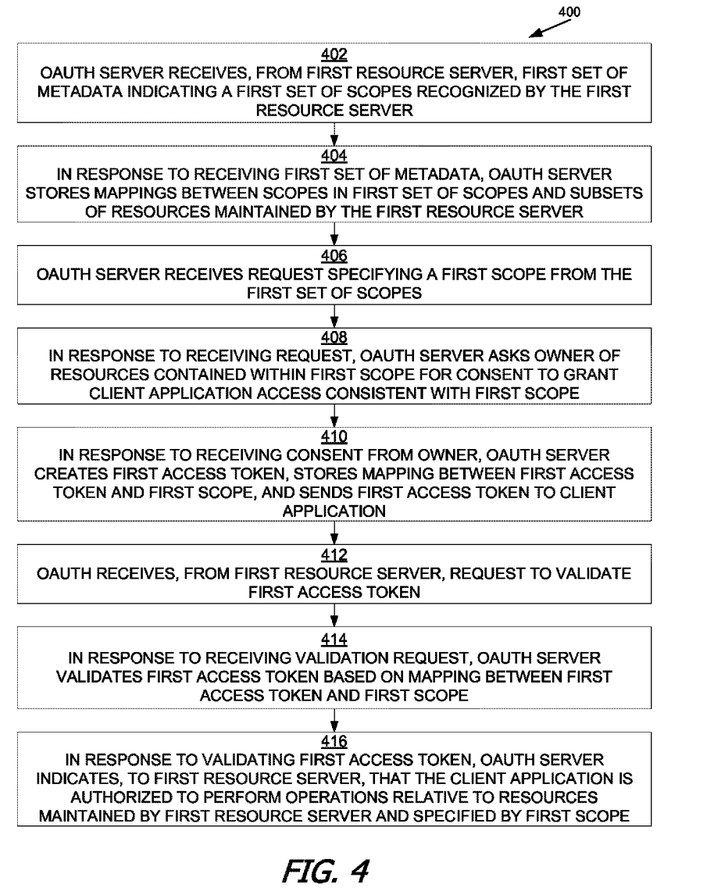
FIG. 4 is a flow diagram illustrating a technique for registering a first resource server's metadata with a generic OAuth authorization server, according to an embodiment of the invention.

FIG. 4 is a flow diagram illustrating a technique 400 for registering a first resource server's metadata with a generic OAuth authorization server, according to an embodiment of the invention. Although technique 400 involves certain blocks or operations, alternative embodiments may involve more, fewer, or different operations than those illustrated. Furthermore, alternative embodiments may involve the performance of operations in an order different from that illustrated. In block 402, an OAuth authorization server receives, from a first resource server, a first set of metadata indicating a first set of scopes that are recognized by the first resource server. In block 404, in response to receiving the first set of metadata, the OAuth authorization server stores mappings between scopes in the first set of scopes and subsets of resources maintained by the first resource server. In one embodiment, in response to receiving the first set of metadata, the OAuth authorization server stores a mapping between a particular scope, a subset of resources stored by the first resource server, and a set of operations that a holder of a particular token mapped to the particular scope is permitted to perform relative to resources in the first subset of resources.

In block 406, the OAuth authorization server receives a particular request specifying a first scope from the first set of scopes. In block 408, in response to receiving the request specifying the first scope, the OAuth authorization server asks an owner of resources contained within the first scope for consent to grant a client application access consistent with the first scope. In block 410, in response to receiving the consent from the owner, the OAuth authorization server (a) creates a first access token, (b) stores a mapping between the first access token and the first scope, and (c) sends the first access token to the client application. In one embodiment, in response to receiving the consent from the owner, the OAuth authorization server invokes programmatic code provided by a customer (e.g., the owner of the first resource server) who does not provide the OAuth authorization server. The programmatic code implements an interface provided to the customer by a provider of the OAuth authorization server. The programmatic code creates the first access token.

In block 412, the OAuth authorization server receives, from the first resource server, a request to validate the first access token. In block 414, in response to receiving the request to validate the first access token, the OAuth authorization server validates the first access token based on the mapping between the first access token and the first scope. In one embodiment, in order to validate the first access token, the OAuth authorization server invokes programmatic code provided by a customer (e.g., the owner of the first resource server) who does not provide the OAuth authorization server. This programmatic code implements an interface provided to the customer by a provider of the OAuth authorization server. The programmatic code validates the first access token.

In block 416, in response to validating the first access token, the OAuth authorization server indicates, to the first resource server, that a client application that presented the first access token to the first resource server is authorized to perform operations relative to a set of resources that are maintained by the first resource server and specified by the first scope.

Figure 5:
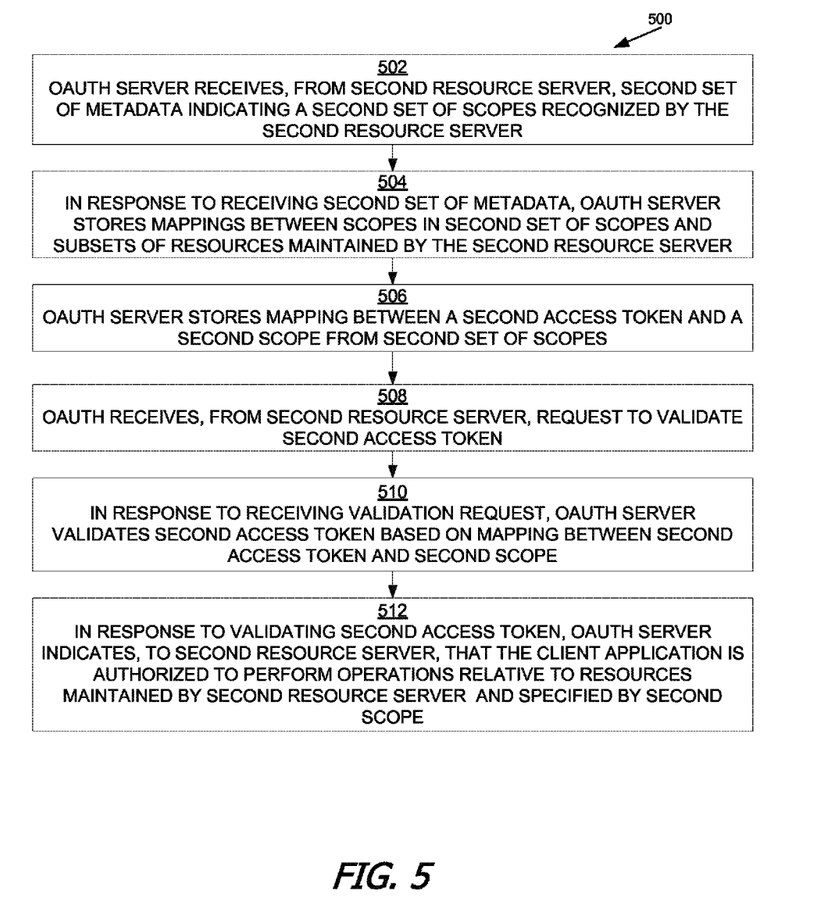
FIG. 5 is a flow diagram illustrating a technique for registering a second resource server's metadata with the generic OAuth authorization server, according to an embodiment of the invention.

FIG. 5 is a flow diagram illustrating a technique for registering a second resource server's metadata with the generic OAuth authorization server, according to an embodiment of the invention. Although technique 500 involves certain blocks or operations, alternative embodiments may involve more, fewer, or different operations than those illustrated. Furthermore, alternative embodiments may involve the performance of operations in an order different from that illustrated. In block 502, the OAuth authorization server receives, from a second resource server that is separate from the first resource server (referenced in FIG. 4), a second set of metadata indicating a second set of scopes that are recognized by the second resource server, the second set of scopes differing from the first set of scopes (referenced in FIG. 4). In block 504, in response to receiving the second set of metadata, the OAuth authorization server stores mappings between scopes in the second set of scopes and subsets of resources maintained by the second resource server. In block 506, the OAuth authorization server stores a mapping between a second access token and a second scope from the second set of scopes. In block 508, the OAuth authorization server receives, from the second resource server, a request to validate the second access token. In block 510, in response to receiving the request to validate the second access token, the OAuth authorization server validates the second access token based on the mapping between the second access token and the second scope. In block 512, in response to validating the second access token, the OAuth authorization server indicates, to the second resource server, that a client application that presented the second access token to the second resource server is authorized to perform operations relative to a set of resources that are maintained by the second resource server and specified by the second scope.

Figure 6:
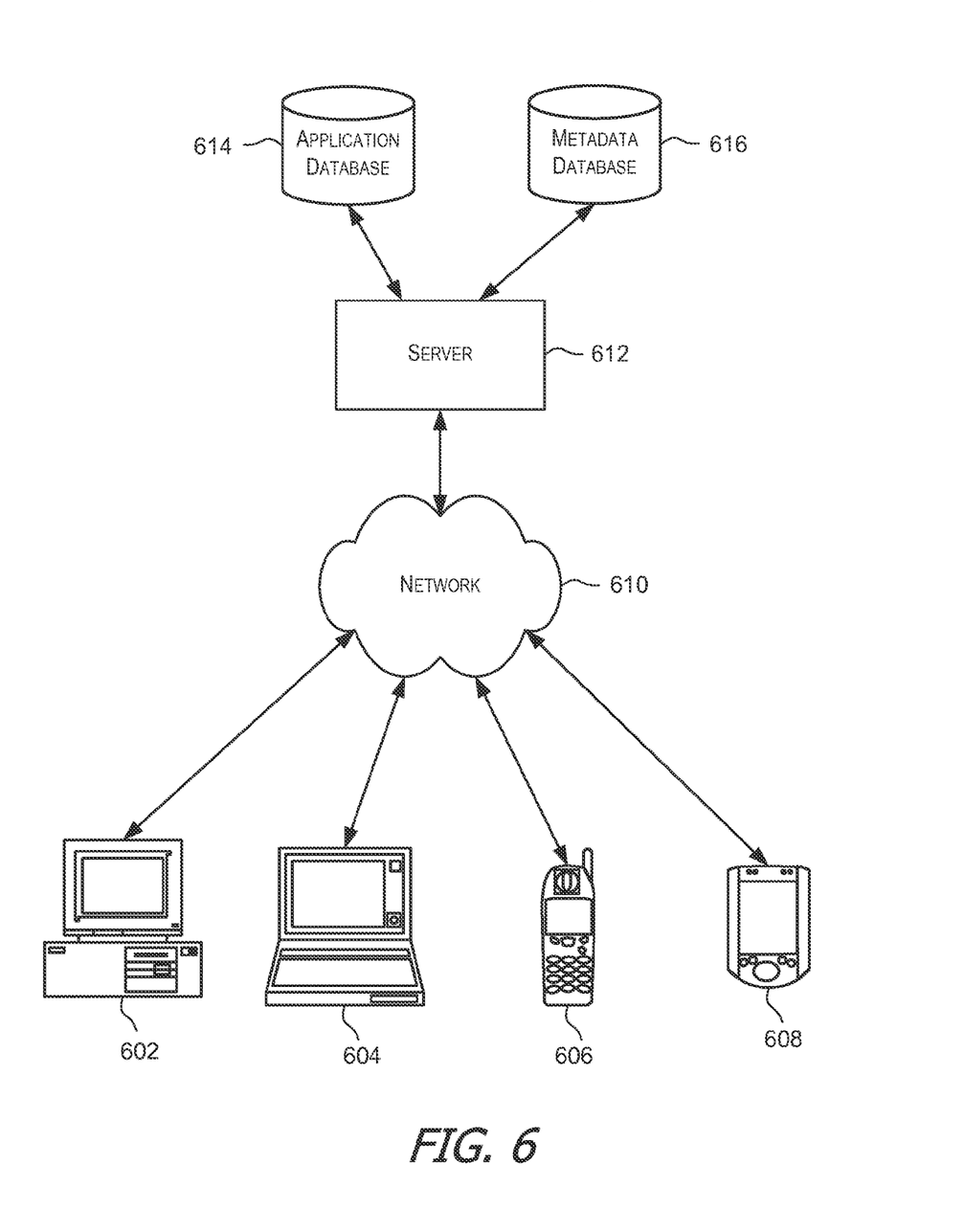
FIG. 6 is a simplified block diagram illustrating components of a system environment that may be used in accordance with an embodiment of the present invention.

FIG. 6 is a simplified block diagram illustrating components of a system environment 600 that may be used in accordance with an embodiment of the present invention. As shown, system environment 600 includes one or more client computing devices 602, 604, 606, 608, which are configured to operate a client application such as a web browser, proprietary client (e.g., Oracle Forms), or the like. In various embodiments, client computing devices 602, 604, 606, and 608 may interact with a server 612.

Client computing devices 602, 604, 606, 608 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 602, 604, 606, and 608 may be any other electronic device, such as a thin-client computer, Internet-enabled gaming system, and/or personal messaging device, capable of communicating over a network (e.g., network 610 described below). Although exemplary system environment 600 is shown with four client computing devices, any number of client computing devices may be supported. Other devices such as devices with sensors, etc. may interact with server 612.

System environment 600 may include a network 610. Network 610 may be any type of network familiar to those skilled in the art that can support data communications using any of a variety of commercially-available protocols, including without limitation TCP/IP, SNA, IPX, AppleTalk, and the like. Merely by way of example, network 610 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 600 also includes one or more server computers 612 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 612 may be adapted to run one or more services or software applications described in the foregoing disclosure. For example, server 612 may correspond to a server for performing relying party and open authorization processing according to an embodiment of the present invention.

Server 612 may run an operating system including any of those discussed above, as well as any commercially available server operating system. Server 612 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 600 may also include one or more databases 614, 616. Databases 614, 616 may reside in a variety of locations. By way of example, one or more of databases 614, 616 may reside on a non-transitory storage medium local to (and/or resident in) server 612. Alternatively, databases 614, 616 may be remote from server 612, and in communication with server 612 via a network-based or dedicated connection. In one set of embodiments, databases 614, 616 may reside in a storage-area network (SAN) familiar to those skilled in the art. Similarly, any necessary files for performing the functions attributed to server 612 may be stored locally on server 612 and/or remotely, as appropriate. In one set of embodiments, databases 614, 616 may include relational databases, such as databases provided by Oracle, that are adapted to store, update, and retrieve data in response to SQL-formatted commands.

Figure 7:
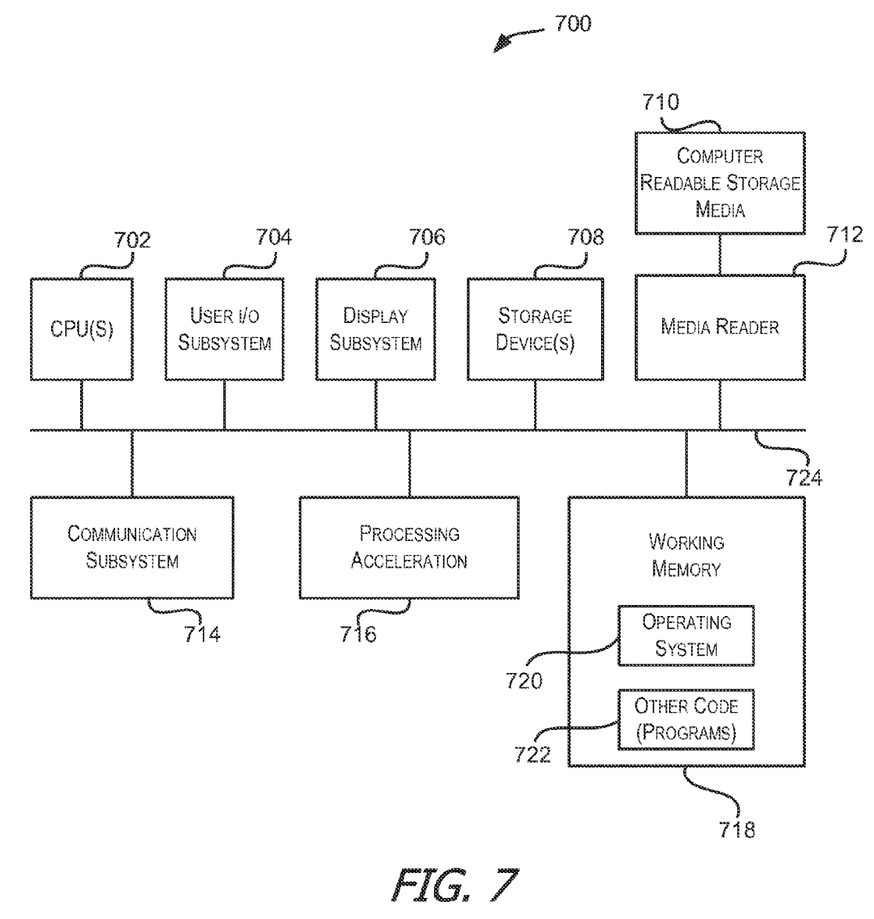
FIG. 7 is a simplified block diagram of a computer system that may be used in accordance with embodiments of the present invention.

FIG. 7 is a simplified block diagram of a computer system 700 that may be used in accordance with embodiments of the present invention. For example server 602 may be implemented using a system such as system 700. Computer system 700 is shown comprising hardware elements that may be electrically coupled via a bus 724. The hardware elements may include one or more central processing units (CPUs) 702, one or more input devices 704 (e.g., a mouse, a keyboard, etc.), and one or more output devices 706 (e.g., a display device, a printer, etc.). Computer system 700 may also include one or more storage devices 708. By way of example, the storage device(s) 708 may include devices such as disk drives, optical storage devices, and solid-state storage devices such as a random access memory (RAM) and/or a read-only memory (ROM), which can be programmable, flash-updateable and/or the like.

Computer system 700 may additionally include a computer-readable storage media reader 712, a communications subsystem 714 (e.g., a modem, a network card (wireless or wired), an infra-red communication device, etc.), and working memory 718, which may include RAM and ROM devices as described above. In some embodiments, computer system 700 may also include a processing acceleration unit 716, which can include a digital signal processor (DSP), a special-purpose processor, and/or the like.

Computer-readable storage media reader 712 can further be connected to a computer-readable storage medium 710, together (and, optionally, in combination with storage device(s) 708) comprehensively representing remote, local, fixed, and/or removable storage devices plus storage media for temporarily and/or more permanently containing computer-readable information. Communications system 714 may permit data to be exchanged with network 1610 and/or any other computer described above with respect to system environment 1600.

Computer system 700 may also comprise software elements, shown as being currently located within working memory 718, including an operating system 720 and/or other code 722, such as an application program (which may be a client application, Web browser, mid-tier application, RDBMS, etc.). In an exemplary embodiment, working memory 718 may include executable code and associated data structures used for relying party and open authorization-related processing as described above. It should be appreciated that alternative embodiments of computer system 700 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope.

What is claimed is:

1. A method comprising:
   receiving, at an OAuth authorization server, from a first resource server that is separate from the OAuth authorization server, a first set of metadata indicating a first set of scopes that are recognized by the first resource server;
   in response to receiving the first set of metadata, storing, at the OAuth authorization server, mappings between scopes in the first set of scopes and subsets of resources maintained by the first resource server;
   storing, at the OAuth authorization server, a mapping between a first access token and a first scope from the first set of scopes;
   receiving, at the OAuth authorization server, from the first resource server, a request to validate the first access token;

in response to receiving the request to validate the first access token, the OAuth authorization server validating the first access token based on the mapping between the first access token and the first scope; and in response to validating the first access token, the OAuth authorization server indicating, to the first resource server, that a client application that presented the first access token to the first resource server is authorized to perform operations relative to a set of resources that are maintained by the first resource server and specified by the first scope;

receiving, at the OAuth authorization server, from a second resource server that is separate from the first resource server, a second set of metadata indicating a second set of scopes that are recognized by the second resource server, the second set of scopes differing from the first set of scopes;

in response to receiving the second set of metadata, storing, at the OAuth authorization server, mappings between scopes in the second set of scopes and subsets of resources maintained by the second resource server;

storing, at the OAuth authorization server, a mapping between a second access token and a second scope from the second set of scopes;

receiving, at the OAuth authorization server, from the second resource server, a request to validate the second access token;

in response to receiving the request to validate the second access token, the OAuth authorization server validating the second access token based on the mapping between the second access token and the second scope; and in response to validating the second access token, the OAuth authorization server indicating, to the second resource server, that a client application that presented the second access token to the second resource server is authorized to perform operations relative to a set of resources that are maintained by the second resource server and specified by the second scope;

wherein the OAuth authorization server does not manage the set of resources that are maintained by the first resource server.

2. The method of claim 1, further comprising:

receiving, at the OAuth authorization server, a particular request specifying the first scope;

in response to receiving the request specifying the first scope, the OAuth authorization server asking an owner of resources contained within the first scope for consent to grant the client application access consistent with the first scope;

in response to receiving the consent from the owner, the OAuth authorization server (a) creating the first access token, (b) storing the mapping between the first access token and the first scope, and (c) sending the first access token to the client application.

3. The method of claim 1, further comprising:

in response to receiving the first set of metadata, storing, at the OAuth authorization server, a mapping between the first scope, a first subset of resources stored by the first resource server, and a first set of operations that a holder of a token mapped to the first scope is permitted to perform relative to resources in the first subset of resources.

4. The method of claim 1, wherein validating the first access token comprises the OAuth authorization server invoking programmatic code provided by a customer who does not provide the OAuth authorization server; wherein the programmatic code implements an interface provided to the customer by a provider of the OAuth authorization server; wherein the programmatic code validates the first access token.

5. The method of claim 1, further comprising:

receiving, at the OAuth authorization server, a particular request specifying the first scope;

in response to receiving the request specifying the first scope, the OAuth authorization server asking an owner of resources contained within the first scope for consent to grant the client application access consistent with the first scope;

in response to receiving the consent from the owner, the OAuth authorization server invoking programmatic code provided by a customer who does not provide the OAuth authorization server; wherein the programmatic code implements an interface provided to the customer by a provider of the OAuth authorization server; wherein the programmatic code creates the first access token.

6. A non-transitory computer-readable memory comprising instructions which, when executed by one or more processors, cause the one or more processors to perform:

receiving, at an OAuth authorization server, from a first resource server that is separate from the OAuth authorization server, a first set of metadata indicating a first set of scopes that are recognized by the first resource server;

in response to receiving the first set of metadata, storing, at the OAuth authorization server, mappings between scopes in the first set of scopes and subsets of resources maintained by the first resource server;

storing, at the OAuth authorization server, a mapping between a first access token and a first scope from the first set of scopes;

receiving, at the OAuth authorization server, from the first resource server, a request to validate the first access token;

in response to receiving the request to validate the first access token, the OAuth authorization server validating the first access token based on the mapping between the first access token and the first scope; and in response to validating the first access token, the OAuth authorization server indicating, to the first resource server, that a client application that presented the first access token to the first resource server is authorized to perform operations relative to a set of resources that are maintained by the first resource server and specified by the first scope;

receiving, at the OAuth authorization server, from a second resource server that is separate from the first resource server, a second set of metadata indicating a second set of scopes that are recognized by the second resource server, the second set of scopes differing from the first set of scopes;

in response to receiving the second set of metadata, storing, at the OAuth authorization server, mappings between scopes in the second set of scopes and subsets of resources maintained by the second resource server;

storing, at the OAuth authorization server, a mapping between a second access token and a second scope from the second set of scopes;

receiving, at the OAuth authorization server, from the second resource server, a request to validate the second access token; in response to receiving the request to validate the second access token, the OAuth authorization server validating the second access token based on the mapping between the second access token and the second scope; and in response to validating the second access token, the OAuth authorization server indicating, to the second resource server, that a client application that presented the second access token to the second resource server is authorized to perform operations relative to a set of resources that are maintained by the second resource server and specified by the second scope;
wherein the OAuth authorization server does not manage the set of resources that are maintained by the first resource server.

7. The non-transitory computer-readable memory of claim 6, wherein the instructions, when executed by the one or more processors, further cause the one or more processors to perform:
receiving, at the OAuth authorization server, a particular request specifying the first scope;
in response to receiving the request specifying the first scope, the OAuth authorization server asking an owner of resources contained within the first scope for consent to grant the client application access consistent with the first scope;
in response to receiving the consent from the owner, the OAuth authorization server (a) creating the first access token, (b) storing the mapping between the first access token and the first scope, and (c) sending the first access token to the client application.

8. The non-transitory computer-readable memory of claim 6, wherein the instructions, when executed by the one or more processors, further cause the one or more processors to perform:
in response to receiving the first set of metadata, storing, at the OAuth authorization server, a mapping between the first scope, a first subset of resources stored by the first resource server, and a first set of operations that a holder of a token mapped to the first scope is permitted to perform relative to resources in the first subset of resources.

9. The non-transitory computer-readable memory of claim 6, wherein validating the first access token comprises the OAuth authorization server invoking programmatic code provided by a customer who does not provide the OAuth authorization server; wherein the programmatic code implements an interface provided to the customer by a provider of the OAuth authorization server; wherein the programmatic code validates the first access token.

10. The non-transitory computer-readable memory of claim 6, wherein the instructions, when executed by the one or more processors, further cause the one or more processors to perform:
receiving, at the OAuth authorization server, a particular request specifying the first scope;
in response to receiving the request specifying the first scope, the OAuth authorization server asking an owner of resources contained within the first scope for consent to grant the client application access consistent with the first scope;
in response to receiving the consent from the owner, the OAuth authorization server invoking programmatic code provided by a customer who does not provide the OAuth authorization server; wherein the programmatic code implements an interface provided to the customer by a provider of the OAuth authorization server; wherein the programmatic code creates the first access token.

11. An OAuth authorization server comprising:
one or more hardware processors that are configured to receive, from a first resource server that is separate from the OAuth authorization server, a first set of metadata indicating a first set of scopes that are recognized by the first resource server;
one or more hardware processors that are configured to store, in response to receiving the first set of metadata, mappings between scopes in the first set of scopes and subsets of resources maintained by the first resource server;
one or more hardware processors that are configured to store a mapping between a first access token and a first scope from the first set of scopes;
one or more hardware processors that are configured to receive, from the first resource server, a request to validate the first access token;
one or more hardware processors that are configured to validate the first access token based on the mapping between the first access token and the first scope in response to receiving the request to validate the first access token; and
one or more hardware processors that are configured to indicate, to the first resource server, in response to validating the first access token, that a client application that presented the first access token to the first resource server is authorized to perform operations relative to a set of resources that are maintained by the first resource server and specified by the first scope;
one or more hardware processors configured to receive, from a second resource server that is separate from the first resource server, a second set of metadata indicating a second set of scopes that are recognized by the second resource server, the second set of scopes differing from the first set of scopes;
one or more hardware processors configured to store, in response to receiving the second set of metadata, mappings between scopes in the second set of scopes and subsets of resources maintained by the second resource server;
one or more hardware processors configured to store a mapping between a second access token and a second scope from the second set of scopes;
one or more hardware processors configured to receive, from the second resource server, a request to validate the second access token;
one or more hardware processors configured to validate the second access token based on the mapping between the second access token and the second scope in response to receiving the request to validate the second access token; and
one or more hardware processors configured to indicate, to the second resource server, in response to validating the second access token, that a client application that presented the second access token to the second resource server is authorized to perform operations relative to a set of resources that are maintained by the second resource server and specified by the second scope;
wherein the OAuth authorization server does not manage the set of resources that are maintained by the first resource server.

12. The OAuth authorization server of claim 11, further comprising:
one or more hardware processors configured to receive a particular request specifying the first scope;
one or more hardware processors configured to ask an owner of resources contained within the first scope for consent to grant the client application access consistent with the first scope in response to receiving the request specifying the first scope;

one or more hardware processors configured to (a) create the first access token, (b) store the mapping between the first access token and the first scope, and (c) send the first access token to the client application in response to receiving the consent from the owner.

13. The OAuth authorization server of claim 11, further comprising:

one or more hardware processors configured to store, in response to receiving the first set of metadata, a mapping between the first scope, a first subset of resources stored by the first resource server, and a first set of operations that a holder of a token mapped to the first scope is permitted to perform relative to resources in the first subset of resources.

14. The OAuth authorization server of claim 11, wherein one or more hardware processors are configured to validate the first access token at least in part by invoking programmatic code provided by a customer who does not provide the OAuth authorization server; wherein the programmatic code implements an interface provided to the customer by a provider of the OAuth authorization server; wherein the programmatic code is configured to validate the first access token.

15. The OAuth authorization server of claim 11, further comprising:

one or more hardware processors configured to receive, at the OAuth authorization server, a particular request specifying the first scope;

one or more hardware processors configured to ask an owner of resources contained within the first scope for consent to grant the client application access consistent with the first scope in response to receiving the request specifying the first scope;

one or more hardware processors configured to invoke programmatic code provided by a customer who does not provide the OAuth authorization server in response to receiving the consent from the owner; wherein the programmatic code implements an interface provided to the customer by a provider of the OAuth authorization server; wherein the programmatic code is configured to create the first access token.

\* \* \* \* \*

UNITED STATES PATENT AND TRADEMARK OFFICE
CERTIFICATE OF CORRECTION

| | |
|---|---|
| PATENT NO. | : 8,935,757 B2 |
| APPLICATION NO. | : 13/631538 |
| DATED | : January 13, 2015 |
| INVENTOR(S) | : Srinivasan et al. |

It is certified that error appears in the above-identified patent and that said Letters Patent is hereby corrected as shown below:

In the Specification

In column 1, lines 32-33, delete "thinking" and insert -- thinking. --, therefor.

Signed and Sealed this
Eighth Day of September, 2015

Michelle K. Lee
*Director of the United States Patent and Trademark Office*